United States Patent
Ji et al.

(10) Patent No.: US 9,266,737 B2
(45) Date of Patent: Feb. 23, 2016

(54) METHOD AND APPARATUS FOR MANUFACTURING GRAPHITE OXIDE

(71) Applicant: IDT INTERNATIONAL CO., LTD., Ulsan (KR)

(72) Inventors: Byoung Kyu Ji, Ulsan (KR); Jung Young Choi, Busan (KR); Cheol Min Shin, Ulsan (KR); Shi Choon Lee, Pohang-si (KR)

(73) Assignee: Standardgraphene Co., Ltd., Ulsan (KR)

( * ) Notice: Subject to any disclaimer, the term of this patent is extended or adjusted under 35 U.S.C. 154(b) by 0 days.

(21) Appl. No.: 14/581,150

(22) Filed: Dec. 23, 2014

(65) Prior Publication Data

US 2015/0108400 A1   Apr. 23, 2015

Related U.S. Application Data

(63) Continuation of application No. PCT/KR2012/008808, filed on Oct. 25, 2012.

(30) Foreign Application Priority Data

Jun. 28, 2012  (KR) .................. 10-2012-0070071

(51) Int. Cl.
*C01B 31/04*   (2006.01)
*B01J 19/10*   (2006.01)
(Continued)

(52) U.S. Cl.
CPC .............. *C01B 31/043* (2013.01); *B01J 8/20* (2013.01); *B01J 19/10* (2013.01); *B01J 19/18* (2013.01);
(Continued)

(58) Field of Classification Search
CPC .............. B01J 19/10; B01J 8/20; B01J 19/18; B01J 19/1831; B01J 19/1862; B01J 2219/0004; B01J 2219/00099; B01J 2219/00103; B01J 2219/00263; B01J 2208/00176; C01B 31/0476; C01B 31/043; C01B 31/04; C01B 31/0407; B82Y 40/00
USPC ....................................................... 423/448
See application file for complete search history.

(56) References Cited

U.S. PATENT DOCUMENTS 2,798,878 A     7/1957  Hummers et al.
2006/0293443 A1 12/2006 Reinheimer et al.
(Continued)

FOREIGN PATENT DOCUMENTS

KR     10-1053933 B1    8/2011
KR     10-1103672 B1    1/2012
WO     WO 2011/019184 A2   2/2011

OTHER PUBLICATIONS

Int'l. Search report of PCT/KR2012/008808 dated Mar. 26, 2013.
(Continued)

*Primary Examiner* — Daniel C McCracken
(74) *Attorney, Agent, or Firm* — Greer Burns & Crain Ltd.

(57) ABSTRACT

There is provided a method and an apparatus for preparing graphite oxide. In accordance with the present disclosure, when an oxidizer is added by stages into a sequencing batch oxidizer mixer connected in multiple stages at a constantly low temperature, the oxidizer is mixed therein while suppressing an oxidation reaction. During an oxidation reaction of graphite, in a risky range of overheating and explosion, a tube type reactor equipped within a heat exchanger is used to accurately control a local temperature and the oxidizer can permeate between layers of the graphite with increased efficiency under ultrasonication. In an additional reaction range out of the risky range, a continuous stirred tank reactor is used to mature the oxidation reaction, so that a risk of explosion during manufacturing of graphite oxide can be reduced and a great amount of graphite oxide can be mass-produced economically.

20 Claims, 2 Drawing Sheets

(51) Int. Cl.
*B01J 8/20* (2006.01)
*B01J 19/18* (2006.01)
*B82Y 40/00* (2011.01)

(52) U.S. Cl.
CPC .......... *B01J 19/1831* (2013.01); *B01J 19/1862* (2013.01); *C01B 31/0476* (2013.01); *B01J 2208/00176* (2013.01); *B01J 2219/0004* (2013.01); *B01J 2219/00099* (2013.01); *B01J 2219/00103* (2013.01); *B01J 2219/00263* (2013.01); *B82Y 40/00* (2013.01)

(56) References Cited

U.S. PATENT DOCUMENTS

2010/0174124 A1* 7/2010 Tonkovich .......... B01J 19/0093
585/23
2012/0201738 A1* 8/2012 Kwon ...................... B01J 6/004
423/415.1

OTHER PUBLICATIONS

Hummers, Jr., et al., "Preparation of Graphitic Oxide", Journal of the American Chemical Society, 1958, vol. 80, No. 6, p. 1339.

* cited by examiner

METHOD AND APPARATUS FOR MANUFACTURING GRAPHITE OXIDE

CROSS-REFERENCE TO RELATED APPLICATION

This application is a continuation of International Patent Application No. PCT/KR2012/008808 filed on Oct. 25, 2012, claiming priority based on Korean Patent Applications No. 10-2012-0070071 filed on Jun. 28, 2012, the contents of all of which are incorporated herein by reference in their entirety.

TECHNICAL FIELD

The present disclosure relates to a method and an apparatus for manufacturing graphite oxide, and particularly, relates to a method and an apparatus for manufacturing graphite oxide serving as an intermediate used for preparing a graphene-structured material.

BACKGROUND ART

In 2004, Professor Andre Geim et al. from the University of Manchester first mechanically exfoliated graphene from graphite by using "Scotch tape method" and found excellent electric conductivity of graphene through the study of a quantum hall effect by using the exfoliated graphene. In 2008, James Hone et al., researchers from Colombia University, confirmed superior strength of graphene. In the same year, Alexander Balandin et al., researchers from University of California, Riverside, measured thermal conductivity of graphene as 5300 pW/mpK, which is double that of carbon nanotubes.

For preparation of graphene, exfoliation of a graphite oxide with a thermal shock, mechanical exfoliation of graphite crystals as carried out by Professor Andre Geim et al., epitaxial growth on substrates, hydrazine reduction on graphite oxide sheet, chemical vapor deposition, and cutting nanotubes in a solution of potassium permanganate and a sulfuric acid have been known but all of them but the exfoliation of a graphite oxide with a thermal shock do not go beyond laboratory preparation levels.

On the other hand, a method of producing expanded graphite, a shape of which is worm-like or accordion-like, by intercalating graphite flakes between graphite crystal layers by adding acids to the graphite flakes and adding a thermal shock thereto has been known since long before. Such worm-like expanded graphite is used as a filler or compression-processed to be used as a sheet having anisotropic conductivity. Such expanded graphite resulting from loose bonding between layers of part of graphite is inferior to graphene in physical properties and its particulate size is much bigger than graphene.

As a method for preparing graphite oxide, there has been known a Staudenmaier method in which graphite powder reacts with a sulfuric acid, a fuming nitric acid, and potassium perchlorate for days to produce graphite oxide. Further, it is described in U.S. Pat. No. 2,798,878 that Hummers shortened a reaction time by using a sulfuric acid, sodium nitrate, and potassium permanganate as oxidants.

A reaction of mixing a sulfuric acid, sodium nitrate, and potassium permanganate together is an exothermic reaction and during the mixing reaction, dimanganese heptoxide ($Mn_2O_7$) produced by a reaction between a sulfuric acid and potassium permanganate may cause an explosion at about 55° C. or more. Thus, in this method, graphite oxide in a very small amount can be prepared only by a batch process and there is a limit on mass production of graphite oxide. Therefore, it is required to develop a process for solving the problems and allowing mass production of graphite oxide.

In Korean Patent Application No. 2010-76871 which is pending, some of the present inventors have suggested a method for continuously preparing graphite oxide using a micro reactor in which multiple micro channels each having a diameter of several μm to several mm and with a residence time of several minutes to several days are connected to each other. However, such a reactor including long and narrow micro channels is useful to carry out a reaction or control a reaction temperature but needs multiple booster pumps throughout the reactor due to a great head loss and also needs an acid-resistant micro channel reactor with high voltage. Further, the reactor has low efficiency for its size.

DISCLOSURE OF INVENTION

Technical Problem

The present disclosure provides a method and an apparatus for preparing graphite oxide suitable to prepare a nano-size graphene-structured material.

Solution to Problem

In view of the foregoing, there is provided a method for manufacturing graphite oxide, the method includes preparing graphite slurry by mixing graphite and a sulfuric acid; mixing the graphite slurry with an oxidizer selected from the group consisting of a permanganic acid, permanganate, and a permanganate sulfuric acid solution by supplying the oxidizer by stages into sequencing batch oxidizer mixers connected to one another in multiple stages; making an intermediate reaction by pressing a reaction mixture mixed with the oxidizer into a tube type reactor having a diameter of about 5 mm to about 50 mm and equipped within a thermostat bath to be applied with ultrasonic waves and keeping the reaction mixture for a residence time in a range of from about 0.2 hours to about 5 hours; making an additional reaction by supplying a reaction mixture of the intermediate reaction into a continuous stirred tank reactor; mixing a reaction mixture of the additional reaction with water added; adding a hydrogen peroxide aqueous solution to the reaction mixture mixed with the water and mixing them to terminate an oxidation reaction; washing and separating graphite oxide from the reaction mixture of the terminated oxidation reaction; and, drying the separated graphite oxide, wherein a carbon/oxygen ratio of the graphite oxide is in a range of from about 1/1 to about 5/1 according to an elemental analyzer and the graphite oxide has a maximum peak in 2θ of around from about 12° to about 14° according to an XRD analysis.

Further, there is provided an apparatus for manufacturing graphite oxide, the apparatus includes a graphite slurry mixer configured to prepare graphite slurry by mixing graphite and a sulfuric acid; sequencing batch oxidizer mixers connected to the graphite slurry mixer in multiple stages from about two stages to about ten stages in series; a tube type reactor having a diameter in a range of from about 5 mm to about 50 mm, a residence time in a range of from about 0.2 hours to about 5 hours, and a length in a range of from about 10 m to about 1000 m that is sequentially connected to the sequencing batch oxidizer mixers and equipped within a thermostat bath to be applied with ultrasonic waves to prepare an intermediate reaction mixture; a continuous stirred tank reactor that is connected to the tube type reactor and makes an additional reaction with the intermediate reaction mixture; a water mixer configured to add water with a reactor mixture of the additional reaction; a hydrogen peroxide mixer configured to add and mix a hydrogen peroxide aqueous solution to a reaction mixture mixed with the water and mix them to terminate an oxidation reaction; a washing and separating unit configured to wash and separate graphite oxide from a reaction mixture of the terminated oxidation reaction; and, a dryer configured to dry the separated graphite oxide.

In the present disclosure, if a carbon/oxygen ratio of graphite oxide is smaller than about 1/1, small graphene can be obtained in the process of exfoliating, and if the carbon/oxygen ratio is greater than about 5/1, an amount of exfoliated graphene is decreased. In both cases, physical properties of graphene become degraded. A gap between the layers of graphite powder as a source is about 3.4 Å, and in the graphite oxide of the present disclosure, a functional group such as a hydroxyl group, a carboxylic acid group, and an epoxy group is formed at each layer through an oxidation reaction. Thus, the gap in the graphite oxide is increased to about 7 Å. The graphite oxide does not have a significant peak except a trace in 2θ of around about 26° which is one of characteristics of graphite powder but has a peak in 2θ of around about 12° in a range of from about 12° to about 14°, for example, from about 12° to about 13° or from about 13° to about 14°, and desirably, at about 12.7° according to an XRD analysis.

In the graphite slurry, a weight ratio of graphite to a sulfuric acid is in a range of from about 1:10 to about 1:100, for example, from about 1:10 to about 1:90, from about 1:20 to about 1:80 or from about 1:30 to about 1:70, and desirably, from about 1:30 to about 1:70. If the weight ratio of graphite to a sulfuric acid is too high, a viscosity of the graphite slurry is increased, and, thus, it is difficult to transfer and mix a reactant within a tube type reactor. If the weight ratio of graphite to a sulfuric acid is too low, reaction efficiency is decreased and a large amount of a waste sulfuric acid by-product can be generated.

Generally, the graphite has a bigger particle size and graphite of about 1 μm or more can be used. By way of example, graphite powder of from about 1 μm to about 300 μm, from about 1 μm to about 250 μm, from about 1 μm to about 200 μm, from about 1 μm to about 150 μm or from about 1 μm to about 100 μm may be used, and desirably, graphite powder of from about 1 μm to about 100 μm may be used. If a particle size of the graphite is too small, an expansion effect affected by a weight density is low and graphene may not be formed well by exfoliation. Moreover, the sulfuric acid may have a concentration of about 70% or more, for example, about 85% to about 98%. The graphite slurry can be prepared by dispersing the graphite powder into the sulfuric acid. A mixture within the graphite slurry mixer is maintained at a temperature in a range of from about 0° C. to about 60° C., for example, from about 2° C. to about 50° C., from about 4° C. to about 40° C., from about 6° C. to about 30° C., from about 7° C. to about 20° C. or from about 8° C. to about 10° C. so as to be maintained during an after-treatment. Desirably, the mixture is maintained at a temperature in a range of from about 8° C. to about 10° C.

The graphite slurry is supplied to a sequencing batch oxidizer mixer connected in multiple stages and each mixer has the same capacity. An oxidizer is supplied by stages to be mixed. In the sequencing batch oxidizer mixer, permanganate and a sulfuric acid need to be mixed with each other at a low temperature in a range of from about 0° C. to about 54° C. In particular, dimanganese heptoxide ($Mn_2O_7$) produced by a reaction between permanganate and a sulfuric acid may cause an explosion at about 55° C. or more. Thus, a permanganic acid or permanganate needs to be supplied by stages in a very small amount to be mixed. Generally, a temperature within the sequencing batch oxidizer mixer is maintained at a low temperature of about 30° C. or less, for example, from about 5° C. to about 30° C., from about 5° C. to about 25° C., from about 5° C. to about 20° C., from about 5° C. to about 15° C., from about 5° C. to about 10° C. or from about 8° C. to about 10° C., and desirably, from about 5° C. to about 30° C., in order to suppress an oxidation reaction and insure safety. Within the sequencing batch oxidizer mixer, less than about 20% of an oxidation reaction can be allowed in a safe range. The sequencing batch oxidizer mixers may be connected to one another in, for example, about two stages or more to about ten stages or less. The oxidizer is selected from the group consisting of a permanganic acid, permanganate, and a permanganate sulfuric acid solution.

In the oxidizer supplied over all, a weight ratio of permanganate to a sulfuric acid is in a range of from about 1:2 to about 1:50, for example, from about 1:3 to about 1:40, from about 1:4 to about 1:30 or from about 1:5 to about 1:30. Desirably, the weight ratio of permanganate to a sulfuric acid is from about 1:5 to about 1:30. The permanganate includes potassium permanganate, sodium permanganate, ammonium permanganate or calcium permanganate. If the weight ratio of permanganate to a sulfuric acid is smaller than the above-described range, an oxidation reaction cannot proceed smoothly. If it is greater, a production cost may be increased due to an increase in a cost of raw materials.

The oxidizer such as the permanganate is supplied to the sequencing batch oxidizer mixer by a fixed-quantity pump connected thereto. The amount of the supplied permanganate is strictly controlled by a fixed-quantity method. The graphite slurry to which the oxidizer is added is pressed into the tube type reactor in order to prevent a risk caused by heat generation in the early stage of the oxidation reaction and to uniformly carry out the oxidation reaction. The tube type reactor is equipped in a thermostat bath in order to accurately control a temperature. The thermostat bath includes a heat exchanger equipped with a cooling unit to control a temperature in a predetermined range. Further, the thermostat bath is applied with ultrasonic waves in order to prepare graphene of a good quality by means of thermal expansion by increasing efficiency of expansion and exfoliation between layers of the graphite. An inner diameter of the tube type reactor is in a range of from about 5 mm to about 50 mm, for example, from about 6 mm to about 35 mm, from about 7 mm to about 20 mm or from about 8 mm to about 12 mm. Desirably, the inner diameter of the tube type reactor is in a range of from about 8 mm to about 12 mm. A residence time of the tube type reactor is in a range of from about 0.2 hours to about 5 hours, for example, from about 0.5 hours to about 4 hours or from about 1 hour to about 3 hours. Desirably, the residence time of the tube type reactor is from about 1 hour to about 3 hours. A length of the tube type reactor is in a range of from about 10 m to about 1000 m, for example, from about 20 m to about 800 m, from about 40 m to about 600 m, from about 60 m to about 400 m or from about 100 m to about 300 m. Desirably, the length of the tube type reactor is from about 100 m to about 300 m. In this case, an output of the ultrasonic waves is in a range of from about 0.05 W/cm$^3$ to about 5.0 W/cm$^3$. There is made an intermediate oxidation reaction of the graphite within the tube type reactor. The intermediate oxidation reaction occurs where the most violent exothermic reaction takes place. Therefore, in order to accurately control a local temperature, the tube type reactor having a small inner diameter is used. In order to accelerate an oxidation reaction between the graphite and the oxidizer, the tube type reactor may be maintained at a temperature in a range of from about 5° C. to about 54° C., for example, from about 15° C. to about 50° C., from about 25° C. to about 50° C., from about 30° C. to about 50° C. or from about 35° C. to about 50° C. Desirably, the tube type reactor is maintained at a temperature in a range of from about 35° C. to about 50° C. This is because at a high temperature facilitates acceleration in the oxidation reaction. In the tube type reactor, the graphite oxidation reaction of from about 40% to about 90%, for example, from about 45% to about 80%, from about 50% to about 70% or from about 55% to about 65% may occur based on a carbon/oxygen elemental analysis. Desirably, the graphite oxidation reaction of from about 50% to about 70% may occur.

After the oxidizer and the graphite are combined with each other within the tube type reactor, at the last part of the oxidation reaction between the remaining graphite and oxidizer, a risk of local heat generation and explosion is greatly reduced. Therefore, by using a continuous stirred tank reactor instead of the long tube type reactor, a preparing apparatus can be simplified and efficient. A rapid oxidation reaction occurs in the tube type reactor, and, thus, a target temperature of the continuous stirred tank reactor is set in a range of from about 8° C. to about 30° C. to be lower than the tube type reactor for the sake of safety. The rest, i.e. about 10% to about 50%, of the oxidation reaction may occur additionally. A residence time is in a range of, for example, from about 0.5 hours to about 5 hours.

Water supply unit may be connected to an additional reaction mixture taken out of the continuous stirred tank reactor to add water to an additional reaction mixture. In this case, desirably, the water may have a low temperature. The water having a low temperature may be, for example, water having the room temperature or less or subcooled water having a temperature of about 0° C. or less. The remaining oxidizer is diluted with the added water. Then, a hydrogen peroxide supply unit is connected and an about 3% hydrogen peroxide aqueous solution is supplied into a hydrogen peroxide mixer through a fixed-quantity pump. The reaction mixture of the oxidation reaction is washed in a washer and it is separated and dried. As a result, graphite oxide can be obtained.

In order to terminate the oxidation reaction, water is added to the additional reaction mixture in a water mixer. In the water mixer, a weight ratio of graphite to water is in a range of, for example, from about 1:1 to about 1:50, from about 1:1 to about 1:80, from about 1:1 to about 1:100, from about 1:1 to about 1:130 or from about 1:1 to about 1:150. Desirably, the weight ratio of graphite to water is in a range of from about 1:1 to about 1:100. If the weight ratio of graphite to water is smaller than the above-described range, the oxidation reaction cannot be ended smoothly. If it is greater, a production cost may be increased due to an increase in a cost of raw materials.

In the hydrogen peroxide aqueous solution, hydrogen peroxide has a concentration in a range of, but not limited to, from about 1 weight % to about 10 weight %, for example, from about 2 weight % to about 7 weight % or from about 3 weight % to about 6 weight %. Desirably, the concentration is in a range of from about 2 weight % to about 7 weight %. A weight ratio of graphite to a hydrogen peroxide aqueous solution is not fixed. However, according to a rule-of-thumb, when a concentration of the hydrogen peroxide is about 3 weight %, the weight ratio of graphite to a hydrogen peroxide aqueous solution may be in a range of from about 1:10 to about 1:100, for example, from about 1:20 to about 1:90, from about 1:30 to about 1:80, from about 1:30 to about 1:70 or from about 1:40 to about 1:60 in a similar way to the weight ratio of graphite to a sulfuric acid. Desirably, the weight ratio of graphite to a hydrogen peroxide aqueous solution is in a range of from about 1:30 to about 1:70. The hydrogen peroxide aqueous solution reduces the remaining permanganate, so that the oxidation reaction of the graphite is ended. When an excessive amount of the hydrogen peroxide aqueous solution is supplied, the process of washing and drying is costly. When a small amount of the hydrogen peroxide aqueous solution is supplied, the oxidation reaction cannot be ended. After the hydrogen peroxide aqueous solution is supplied, a maintenance time may be within several ten minutes.

When the hydrogen peroxide aqueous solution is supplied, the remaining permanganic acid is reduced. The reaction mixture of the oxidation reaction is washed with pure water or water of an appropriate pH, for example, from about 5 to about 6 one or more times and dried in a depressurized state at about 200° C. or less, for example, about 150° C., about 120° C., about 100° C. or, desirably, about 80° C. or less, for less than about 96 hours. The process of washing and drying can be performed separately from or continuously with the previous stage.

The washed graphite oxide is separated, dried, and stored in a graphite oxide storage.

Advantageous Effects of Invention

In accordance with the present disclosure, when an oxidizer is added by stages into a sequencing batch oxidizer mixer connected in multiple stages at a constantly low temperature, the oxidizer is mixed therein while suppressing an oxidation reaction. During an oxidation reaction of graphite, in a risky range of overheating and explosion, a tube type reactor equipped in a heat exchanger is used to accurately control a local temperature and the oxidizer can permeate between layers of the graphite with increased efficiency under ultrasonication. In an additional reaction range out of the risky range, a continuous stirred tank reactor is used to mature the oxidation reaction, so that a risk of explosion during manufacturing of graphite oxide can be reduced and a great amount of graphite oxide can be mass-produced economically.

A nano-size graphene-structured material obtained by exfoliating the graphite oxide has physical properties comparable to those of a carbon nanotube. Further, the nano-size graphene-structured material easily obtains superior dispersibility as compared with a carbon nanotube having low dispersibility due to a small amount of a remaining functional group such as a carboxyl group or a hydroxyl group.

BEST MODE FOR CARRYING OUT THE INVENTION

Hereinafter, illustrative embodiments of the present disclosure will be described in detail with reference to the accompanying drawings. The drawings are provided in a pilot plant scale and can be scaled up by adjusting a reaction temperature and extending a reaction time.

Figure 1:
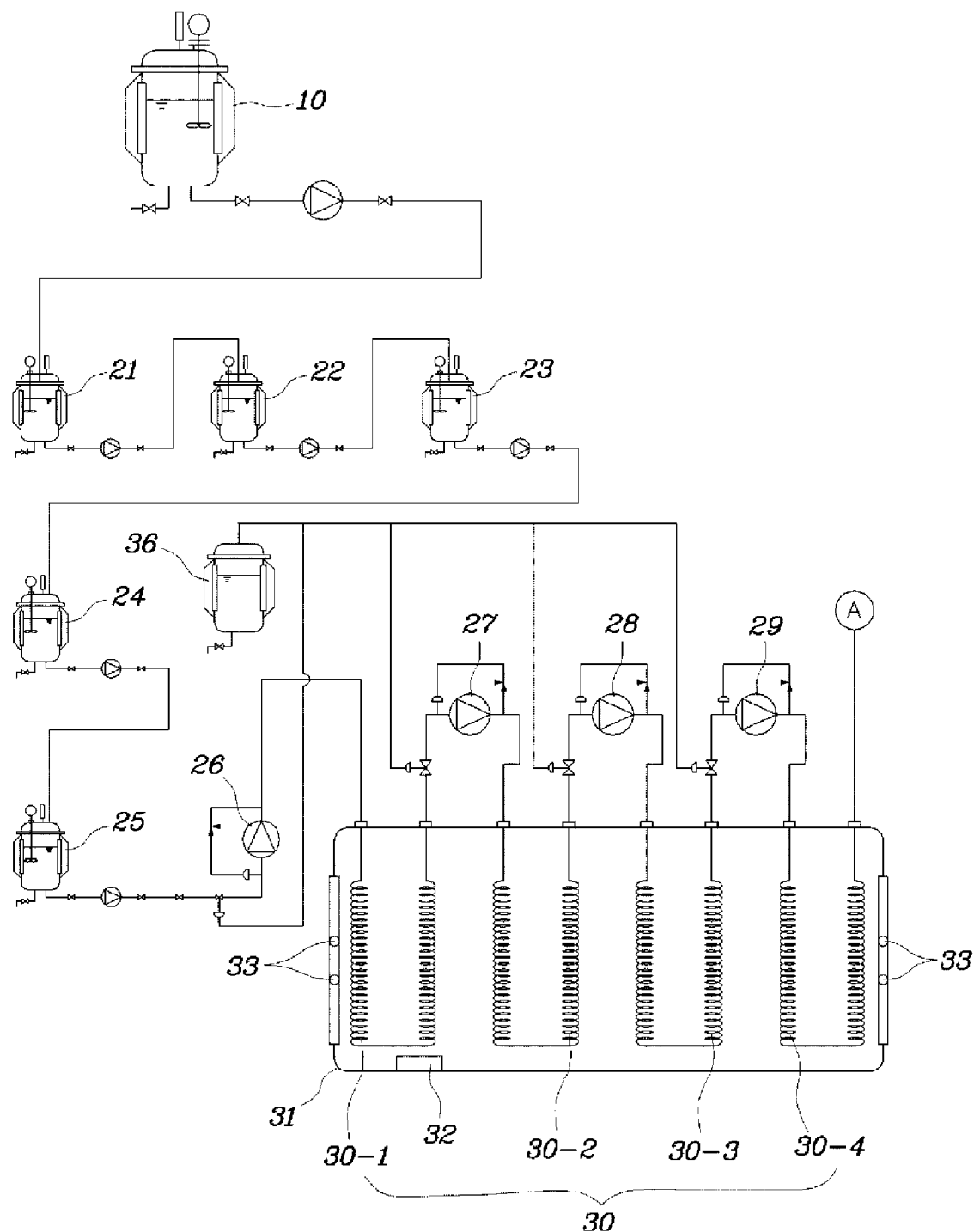
FIG. 1 is a process diagram showing a process up to an intermediate oxidation reaction in an apparatus for preparing graphite oxide in accordance with an illustrative embodiment of the present disclosure.

Referring to FIG. 1, graphite powder and a concentrated sulfuric acid solution having a concentration of about 70% or more, for example, from about 85% to about 98%, are supplied to a graphite slurry mixer 10 with a capacity of about 50 l at a weight ratio of about 1:50 so as to prepare graphite slurry of about 40 l. A temperature in the graphite slurry mixer 10 is maintained in a range of from about 0° C. to about 60° C., for example, from about 2° C. to about 50° C., from about 4° C. to about 40° C., from about 6° C. to about 30° C., from about 7° C. to about 20° C. or from about 8° C. to about 10° C. for the following process. Desirably, the temperature in the graphite slurry mixer 10 is maintained in a range of from about 8° C. to about 10° C. The graphite slurry can be prepared by dispersing the graphite powder into the sulfuric acid solution.

The temperature in the graphite slurry mixer 10 can be maintained by, for example, a heat exchanger equipped with a cooling unit.

If a weight ratio of graphite to a sulfuric acid is too high, a viscosity of the graphite slurry is increased and reactants cannot be transferred and mixed smoothly within a tube type reactor. If the weight ratio of graphite to a sulfuric acid is too low, reaction efficiency is decreased and a large amount of a waste sulfuric acid by-product can be generated. Therefore, the weight ratio of graphite to a sulfuric acid is in a range of from about 1:10 to about 1:100, from about 1:10 to about 1:90, from about 1:20 to about 1:80, from about 1:30 to about 1:70 or from about 1:40 to about 1:60. Desirably, the weight ratio of graphite to a sulfuric acid is in a range of from about 1:30 to about 1:70.

Generally, graphite used for the graphite slurry is prefer as a particle size is increased the graphite having the particle size of about 1 μm or more can be used. By way of example, graphite powder has a particle size in a range of, for example, from about 1 μm to about 300 μm, from about 1 μm to about 250 μm, from about 1 μm to about 200 μm, from about 1 μm to about 150 μm or from about 1 μm to about 100 μm. Desirably, the graphite powder has a particle size in a range of from about 1 μm to about 100 μm. If a particle size of the graphite is too small, an expansion effect affected by a weight density is low and graphene may not be formed well by exfoliation.

Further, desirably, the sulfuric acid has a concentration of about 70% or more, for example, about 85% to about 98%.

Referring to FIG. 1, the graphite slurry obtained from the graphite slurry mixer 10 is supplied into a sequencing batch oxidizer mixer 21 connected in five stages in series. An oxidation reaction occurring in sequencing batch oxidizer mixers 21, 22, 23, 24, and 25 is an exothermic reaction, and during the oxidation reaction, dimanganese heptoxide ($Mn_2O_7$) produced by the reaction may cause an explosion at about 55° C. or more. Therefore, an oxidizer in a small amount of about 2 l is introduced into the sequencing batch oxidizer mixers 21, 22, 23, 24, and 25 in order to prevent an explosion caused by local overheating. A temperature of the slurry mixed with the oxidizer is controlled accurately in a range of from about 8° C. to about 10° C. and permanganate serving as the oxidizer is distributed and added into the respective sequencing batch oxidizer mixers 21, 22, 23, 24, and 25.

In the oxidizer supplied over all, a weight ratio of permanganate to a sulfuric acid is in a range of from about 1:2 to about 1:50, for example, from about 1:3 to about 1:40, from about 1:4 to about 1:30 or from about 1:5 to about 1:30. Desirably, the weight ratio of permanganate to a sulfuric acid is from about 1:5 to about 1:30. The permanganate includes potassium permanganate, sodium permanganate, ammonium permanganate or calcium permanganate. If the weight ratio of permanganate to a sulfuric acid is smaller than the above-described range, the oxidation reaction cannot proceed smoothly. If it is greater, a production cost may be increased due to an increase in a cost of raw materials.

Referring to FIG. 1, each of the sequencing batch oxidizer mixers 21, 22, 23, 24, and 25 includes a fixed-quantity pump and a valve, and, thus, the amount of the supplied permanganate serving as the oxidizer is strictly controlled by a fixed-quantity method and the supplied permanganate is distributed and added to respective sequencing batch oxidizer mixers 21, 22, 23, 24, and 25.

Within the sequencing batch oxidizer mixers 21, 22, 23, 24, and 25, less than about 20% of an oxidation reaction can be allowed in a safe range.

It is not necessary to connect the sequencing batch oxidizer mixers 21, 22, 23, 24, and 25 in five stages in series if they are connected to one another in multiple stages in series. By way of example, the sequencing batch oxidizer mixers 21, 22, 23, 24, and 25 may be connected to one another in, for example, about two stages to about ten stages in series if necessary.

A temperature in the respective sequencing batch oxidizer mixers 21, 22, 23, 24, and 25 can be maintained by, for example, a heat exchanger equipped with a cooling unit provided in the respective sequencing batch oxidizer mixers 21, 22, 23, 24, and 25. The temperature in the respective sequencing batch oxidizer mixers 21, 22, 23, 24, and 25 is maintained in a range of, for example, from about 5° C. to about 30° C., from about 5° C. to about 25° C., from about 5° C. to about 20° C., from about 5° C. to about 15° C., from about 5° C. to about 10° C. or from about 8° C. to about 10° C. Desirably, the temperature in the respective sequencing batch oxidizer mixers 21, 22, 23, 24, and 25 is maintained in a range of from about 5° C. to about 30° C.

Referring to FIG. 1, the oxidizer-mixed slurry added with the oxidizer in five stages is pressed into a tube type reactor 30 having an inner diameter of about 10 mm and including four stages through a pump 26. The tube type reactor 30 is equipped in a thermostat bath 31 including an ultrasonic wave transducer 32 and a cooler 33. In order to reduce a head loss of the pressed slurry, three pumps 27, 28, and 29 are provided therebetween to increase a pressure. A total length of the tube type reactor 30 is about 200 m and a residence time is about 2 hours. A depressurizing device 36 is connected to the respective pumps 26, 27, 28, and 29, so that a pumping pressure can be controlled according to an internal pressure of the tube type reactor 30.

The oxidizer-mixed slurry is pressed into the tube type reactor 30 in order to prevent a risk caused by heat generation in the early stage of the oxidation reaction and to uniformly carry out the oxidation reaction.

As explained above, the oxidation reaction of the oxidizer-mixed slurry is an exothermic reaction and there is a risk of explosion during the reaction. Further, in order to accelerate the oxidation reaction between the graphite and the oxidizer, it is desirable to maintain a temperature in the tube type reactor 30 in a predetermined range. Therefore, as depicted in FIG. 1, the cooler 33 is provided within the thermostat bath 31, so that it is possible to prevent the risk of explosion and also possible to maintain the temperature in the tube type reactor 30 in a predetermined range.

Further, the ultrasonic wave transducer 32 is provided within the thermostat bath 31, so that it is possible to increase efficiency of expansion and exfoliation between layers of the graphite under ultrasonication. In this way, graphene of a good quality can be prepared by means of thermal expansion. By way of example, an output of ultrasonic waves output from the ultrasonic wave transducer 32 is in a range of from about 0.05 W/cm³ to about 5.0 W/cm³.

The tube type reactor 30 may have a small inner diameter and a long length in a spiral shape so as to be provided within the thermostat bath 31. There is made an intermediate oxidation reaction of the graphite within the tube type reactor 30. The intermediate oxidation reaction occurs where the most violent exothermic reaction takes place. Therefore, in order to accurately control a local temperature, desirably, the tube type reactor 30 has a small inner diameter. By way of example, the inner diameter of the tube type reactor 30 is in a range of from about 5 mm to about 50 mm, for example, from about 6 mm to about 35 mm, from about 7 mm to about 20 mm or from about 8 mm to about 12 mm. Desirably, the inner diameter of the tube type reactor is in a range of from about 8 mm to about 12 mm.

In the tube type reactor 30, the graphite oxidation reaction of from about 40% to about 90%, for example, from about 45% to about 80%, from about 50% to about 70% or from about 55% to about 65% may occur based on a carbon/oxygen elemental analysis. Desirably, the graphite oxidation reaction of from about 50% to about 70% may occur. In order to make an oxidation reaction of the graphite as described above, the tube type reactor 30 may be longer an a total length thereof may be in a range of from about 10 m to about 1000 m, for example, from about 20 m to about 800 m, from about 40 m to about 600 m, from about 60 m to about 400 m or from about 100 m to about 300 m. Desirably, the total length of the tube type reactor 30 may be about 200 m.

Since the tube type reactor 30 is formed in a spiral shape, the number of contacts between the graphite slurry and the oxidizer in the tube type reactor 30 is increased and the oxidation reaction can proceed actively.

Further, if the tube type reactor 30 is formed in a spiral shape, a space occupied by the long tube type reactor 30 in the thermostat bath 31 is decreased, and, thus, a size of the thermostat bath 31 can be reduced. Therefore, a size of the apparatus for preparing the graphite oxide can be minimized and a limit on a space occupied by the apparatus for preparing the graphite oxide can be reduced.

Furthermore, if the tube type reactor 30 has a long length, there may be a head loss while the graphite slurry pressed into the tube type reactor 30 passes through the tube type reactor 30. Therefore, as depicted in FIG. 1, the spiral-shaped tube type reactor 30 includes multiple stages, for example, four stages, and the pumps 27, 28, and 29 are provided between the stages to increase a pressure and decreased the head loss. The depressurizing device 36 is connected to the respective pumps 27, 28, and 29, so that a pumping pressure can be controlled according to an internal pressure of the tube type reactor 30.

The tube type reactor 30 is maintained at a temperature in a range of from about 5° C. to about 54° C., for example, from about 15° C. to about 50° C., from about 25° C. to about 50° C. from about 30° C. to about 50° C. or from about 35° C. to about 50° C. Desirably, the tube type reactor 30 is maintained at a temperature in a range of from about 30° C. to about 50° C. This is because a high temperature is advantageous for accelerating the oxidation reaction between the graphite and the oxidizer.

Figure 2:
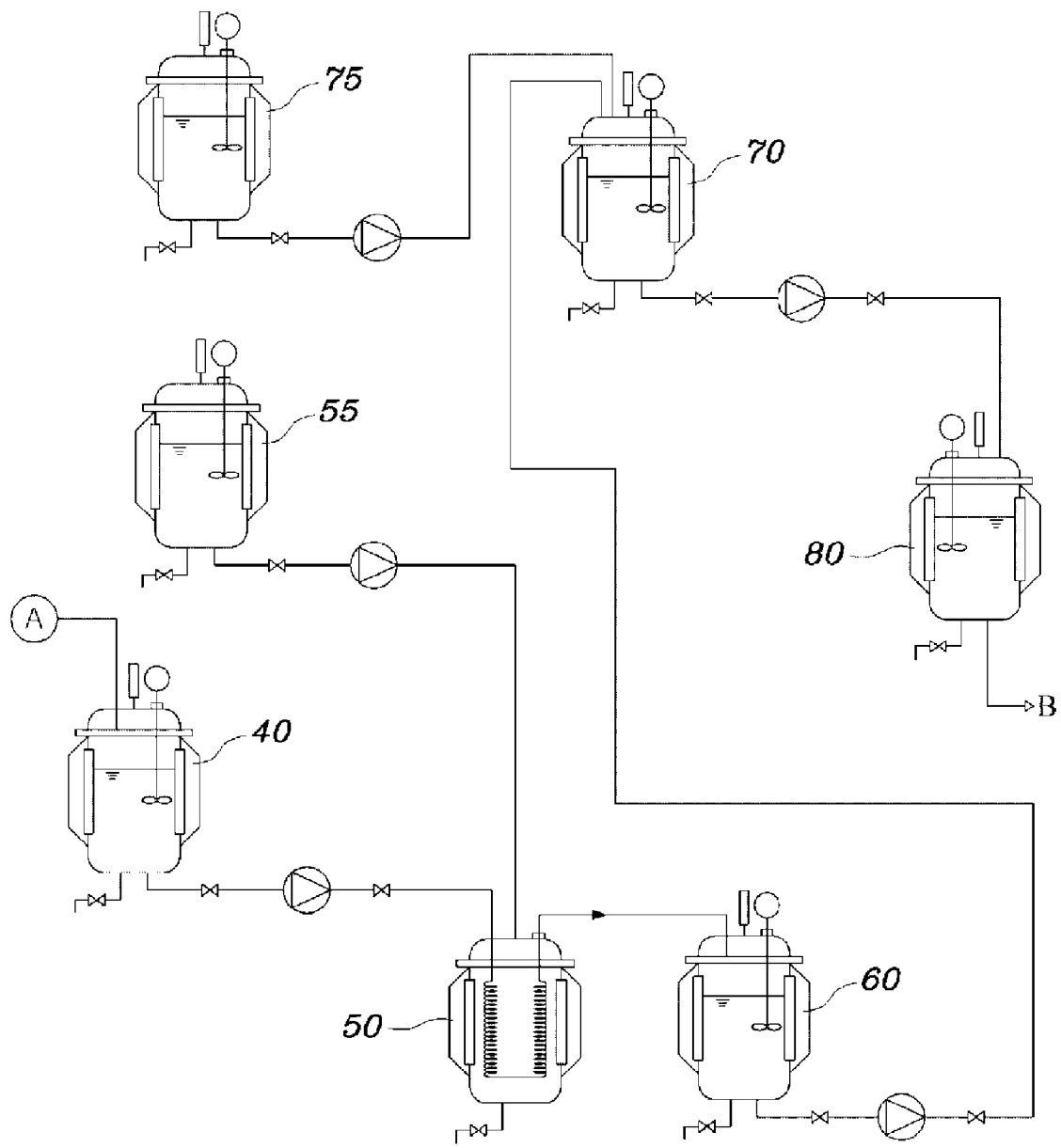
FIG. 2 is a process diagram after the process as shown in FIG. 1 in an apparatus for preparing graphite oxide in accordance with an illustrative embodiment of the present disclosure.

An intermediate graphite oxide A pressed out of the tube type reactor 30 is additionally oxidized in a continuous stirred tank reactor 40 with a capacity of about 50 l as depicted in FIG. 2.

Target graphite oxide can be obtained from the additional oxidation reaction of the intermediate graphite oxide A in which the oxidizer is intercalated between layers within the tube type reactor 30. A residence time is about 2 hours. After the oxidizer and the graphite are combined with each other within the tube type reactor 30, at the last part of the oxidation reaction between the remaining graphite and oxidizer, a risk of local heat generation and explosion is greatly reduced. Therefore, by using the continuous stirred tank reactor 40 instead of the long tube type reactor 30, the preparing apparatus can be simplified and efficient.

By way of example, if about 40% to about 80% of the oxidation reaction between the graphite and the oxidizer occurs in the tube type reactor 30, the rest, i.e. about 20% to about 60%, of the oxidation reaction may occur in the continuous stirred tank reactor 40.

A rapid oxidation reaction occurs in the tube type reactor 30, and, thus, a target temperature of the continuous stirred tank reactor 40 is set in a range of from about 8° C. to about 30° C. to be lower than the tube type reactor for the sake of safety.

The additional oxidation reaction between the intermediate graphite oxide A and the remaining graphite and oxidizer within the continuous stirred tank reactor 40 and an additional reaction mixture is prepared accordingly.

Referring to FIG. 2, a water mixer 50 connects a water supply unit 55 to add water to the additional reaction mixture supplied from the continuous stirred tank reactor 40 and prepare a reaction mixture 60 diluted with the remaining oxidizer. Then, the reaction mixture 60 diluted with the remaining oxidizer is connected to a hydrogen peroxide supply unit 75 and an about 3% hydrogen peroxide aqueous solution is supplied to a hydrogen peroxide mixer 70 through a fixed-quantity pump, and the oxidation reaction is terminated.

The water added from the water supply unit 55 may have a low temperature, for example, the room temperature or less or about 0° C. or less. Desirably, the temperature may be about 0° C. or less.

Further, regarding the water added from the water supply unit 55, a weight ratio of graphite to water is in a range of, for example, from about 1:1 to about 1:50, from about 1:1 to about 1:80, from about 1:1 to about 1:100, from about 1:1 to about 1:130 or from about 1:1 to about 1:150. Desirably, the weight ratio of graphite to water is in a range of from about 1:1 to about 1:100. If the weight ratio of graphite to water is smaller than the above-described range, the oxidation reaction cannot be ended smoothly. If it is greater, a production cost may be increased due to an increase in a cost of raw materials.

The hydrogen peroxide aqueous solution supplied from the hydrogen peroxide supply unit 75 reduces the remaining permanganate, so that the oxidation reaction of the graphite is terminated.

When an excessive amount of the hydrogen peroxide aqueous solution is supplied, a process of washing and drying is costly. When a small amount of the hydrogen peroxide aqueous solution is supplied, the oxidation reaction cannot be terminated.

After the hydrogen peroxide aqueous solution is supplied, a maintenance time may be within several ten minutes.

The hydrogen peroxide aqueous solution has a concentration in a range of, but not limited to, from about 1 weight % to about 10 weight %, for example, from about 2 weight % to about 7 weight % or from about 3 weight % to about 6 weight %. Desirably, the concentration is in a range of from about 2 weight % to about 7 weight %.

Further, a weight ratio of graphite to a hydrogen peroxide aqueous solution is not quantitative. However, according to a rule-of-thumb, when a concentration of hydrogen peroxide is about 3 weight %, the weight ratio of graphite to a hydrogen peroxide aqueous solution may be in a range of from about 1:10 to about 1:100, for example, from about 1:20 to about 1:90, from about 1:30 to about 1:80, from about 1:30 to about 1:70 or from about 1:40 to about 1:60 in a similar way to the weight ratio of graphite to a sulfuric acid. Desirably, the weight ratio of graphite to a hydrogen peroxide aqueous solution is in a range of from about 1:30 to about 1:70.

In the reaction mixture of the oxidation reaction, washed graphite oxide B supplied from a washer 80 is separated and dried. As a result, target graphite oxide can be obtained. The obtained graphite oxide B has a chemical formula of $C_1O_{3.65}H_{2.45}$ according to an elemental analysis.

Desirably, the reaction mixture of the oxidation reaction is supplied into the washer 80 before being dried.

By way of example, water used in the washer 80 may have a pH in a range of from about 5 to about 6. Further, the reaction mixture is washed with such water one or more times.

The washed reaction mixture is dried in a depressurized state at about 200° C. or less, for example, about 150° C., about 120° C., about 100° C. or, desirably, about 80° C. or less, for less than about 96 hours. The process of washing and drying can be performed separately from or continuously with the previous stage.

If a carbon/oxygen ratio of graphite oxide obtained in accordance with the present disclosure is smaller than about 1/1, small graphene can be obtained in the process of exfoliating, and if the carbon/oxygen ratio is greater than about 5/1, an amount of exfoliated graphene is decreased. In both cases, physical properties of graphene become degraded. A gap in graphite powder as a source is about 3.4 Å, and in the graphite oxide obtained in accordance with the present disclosure, a functional group such as a hydroxyl group, a carboxylic acid group, and an epoxy group is formed at each layer through an oxidation reaction. Thus, a gap between layers of the graphite oxide is increased to about 7 Å. The graphite oxide does not have a significant peak except a trace in 2θ of around about 26° which is one of characteristics of graphite powder but has a peak in 2θ of around about 12° in a range of from about 12° to about 14°, for example, from about 12° to about 13° or from about 13° to about 14°, and desirably, at about 12.7° according to an XRD analysis.

Regarding the graphite oxide B obtained as described above, an oxidation reaction occurs uniformly between layers of the graphite oxide B under ultrasonication and the graphite oxide B is exfoliated with a thermal shock. As a result, graphene of a good quality can be obtained. The above description of the illustrative embodiments is provided for the purpose of illustration, and it would be understood by those skilled in the art that various changes and modifications may be made without changing technical conception and essential features of the illustrative embodiments. The scope of the illustrative embodiments is defined by the following claims rather than by the detailed description of the illustrative embodiments. It shall be understood that all modifications and embodiments conceived from the meaning and scope of the claims and their equivalents are included in the scope of the illustrative embodiments.

The invention claimed is:

1. A method for manufacturing graphite oxide, the method comprising:
   preparing graphite slurry by mixing graphite and a sulfuric acid;
   mixing the graphite slurry with an oxidizer selected from the group consisting of a permanganic acid, permanganate, and a permanganate sulfuric acid solution by supplying the oxidizer by stages into sequencing batch oxidizer mixers connected to one another in multiple stages;
   making an intermediate reaction by pressing a reaction mixture mixed with the oxidizer into a tube type reactor equipped within a thermostat bath to be applied with ultrasonic waves;
   making an additional reaction by supplying a reaction mixture of the intermediate reaction into a continuous stirred tank reactor;
   mixing a reaction mixture of the additional reaction with water added;
   adding a hydrogen peroxide aqueous solution to the reaction mixture mixed with the water and mixing them to terminate an oxidation reaction;
   washing and separating graphite oxide from the reaction mixture of the terminated oxidation reaction; and
   drying the separated graphite oxide.

2. The method of claim 1,
   wherein the tube type reactor has a diameter of about 5 mm to about 50 mm and the reaction mixture is kept for a residence time in a range of from about 0.2 hours to about 5 hours in the making of the intermediate reaction; and
   wherein a carbon/oxygen ratio of the graphite oxide is in a range of from about 1/1 to about 5/1 according to an elemental analyzer and the graphite oxide has a maximum peak in 2θ of from about 12° to about 14° according to an XRD analysis.

3. The method of claim 1, wherein the graphite slurry is mixed at a weight ratio of graphite to the sulfuric acid in a range of from about 1:30 to about 1:70.

4. The method of claim 1, wherein the graphite slurry is supplied to the sequencing batch oxidizer mixers connected to one another in about two stages to about ten stages and each having a same capacity and the oxidizer is supplied by stages to be mixed with the graphite slurry.

5. The method of claim 1, wherein graphite powder of the graphite slurry has a particle size in a range of from about 1 μm to about 100 μm.

6. The method of claim 1, wherein the tube type reactor has an inner diameter in a range of from about 5 mm to about 50 mm, a residence time in a range of from about 0.2 hours to about 5 hours, and a length in a range of from about 10 m to about 1000 m.

7. The method of claim 1, wherein about 50% to about 70% of the total oxidation reaction of the graphite occurs in the tube type reactor.

8. The method of claim 7, wherein the rest of the oxidation reaction additionally occurs in the continuous stirred tank reactor.

9. An apparatus for manufacturing graphite oxide, the apparatus comprising:
   a graphite slurry mixer configured to prepare graphite slurry by mixing graphite and a sulfuric acid;
   sequencing batch oxidizer mixers connected to the graphite slurry mixer in multiple stages from about two stages to about ten stages in series;
   a tube type reactor having an inner diameter in a range of from about 5 mm to about 50 mm, a residence time in a range of from about 0.2 hours to about 5 hours, and a length in a range of from about 10 m to about 1000 m that is sequentially connected to the sequencing batch oxidizer mixers and equipped within a thermostat bath to be applied with ultrasonic waves to prepare an intermediate reaction mixture;

a continuous stirred tank reactor that is connected to the tube type reactor and makes an additional reaction with the intermediate reaction mixture;

a water mixer configured to add water to a reaction and mixing the water with a reaction mixture of the additional reaction;

a hydrogen peroxide mixer configured to add and mix a hydrogen peroxide aqueous solution to a reaction mixture mixed with the water and mixing them to terminate an oxidation reaction;

a washing and separating unit configured to wash and separate graphite oxide from a reaction mixture of the terminated oxidation reaction; and a dryer configured to dry the separated graphite oxide.

10. The apparatus of claim 9, wherein the graphite slurry is mixed at a weight ratio of graphite to the sulfuric acid in a range of from about 1:30 to about 1:70.

11. The apparatus of claim 9, wherein a carbon/oxygen ratio of the graphite oxide is in a range of from about 1/1 to about 5/1 according to an elemental analyzer and the graphite oxide has a maximum peak in 2θ of from about 12° to about 14° according to an XRD analysis.

12. The apparatus of claim 9, wherein graphite powder of the graphite slurry has a particle size in a range of from about 1 μm to about 100 μm.

13. The apparatus of claim 9, wherein the tube type reactor has the inner diameter in a range of from about 8 mm to about 12 mm, the residence time in a range of from about 1 hour to about 3 hours, and the length in a range of from about 100 m to about 300 m.

14. The apparatus of claim 9, wherein about 50% to about 70% of the total oxidation reaction of the graphite occurs in the tube type reactor.

15. The apparatus of claim 14, wherein the rest of the oxidation reaction additionally occurs in the continuous stirred tank reactor.

16. An apparatus for manufacturing graphite oxide, the apparatus comprising:

a graphite slurry mixer configured to prepare graphite slurry by mixing graphite and a sulfuric acid;

sequencing batch oxidizer mixers connected to the graphite slurry mixer in multiple stages in series;

a tube type reactor that is sequentially connected to the sequencing batch oxidizer mixers and equipped within a thermostat bath to be applied with ultrasonic waves to prepare an intermediate reaction mixture;

a continuous stirred tank reactor that is connected to the tube type reactor and makes an additional reaction with the intermediate reaction mixture;

a water mixer configured to add and mix water with a reaction mixture of the additional reaction;

a hydrogen peroxide mixer configured to add and mix a hydrogen peroxide aqueous solution with a reaction mixture mixed with the water and end an oxidation reaction;

a washing and separating unit configured to wash and separate graphite oxide from a reaction mixture of the oxidation reaction; and a dryer configured to dry the separated graphite oxide.

17. The apparatus of claim 16, wherein the thermostat bath comprising:

an ultrasonic wave transducer configured to applying the ultrasonic waves; and a cooler configured to maintain a temperature of the thermostat bath.

18. The apparatus of claim 16, wherein the tube type reactor has a small inner diameter to accurately control a local temperature.

19. The apparatus of claim 16, wherein the tube type reactor is formed in a spiral shape.

20. The apparatus of claim 16, wherein the tube type reactor includes multiple stages, and pumps each connected to a depressurizing device are provided between the stages to decrease a head loss of graphite slurry pressed into the tube type reactor.

* * * * *